No. 11,969. Reissued Feb. 18, 1902.

E. GREIL & E. AUDIGER.

ELECTRIC CONTACT OR CURRENT TAKING DEVICE.

(Application filed Aug. 9, 1901.)

Witnesses.
Robt Everett,
Dennis Sunby.

Inventors.
Ernest Greil.
Emile Audiger.
By James L. Norris.
Atty.

UNITED STATES PATENT OFFICE.

ERNEST GREIL AND EMILE AUDIGER, OF PARIS, FRANCE, ASSIGNORS, BY MESNE ASSIGNMENTS, TO NATIONAL ELECTRIC IMPROVEMENT COMPANY, OF NEW YORK, N. Y., A CORPORATION OF NEW JERSEY.

ELECTRIC CONTACT OR CURRENT-TAKING DEVICE.

SPECIFICATION forming part of Reissued Letters Patent No. 11,969, dated February 18, 1902

Original No. 663,750, dated December 11, 1900. Application for reissue filed August 9, 1901. Serial No. 71,528.

DIVISION B.

*To all whom it may concern:*

Be it known that we, ERNEST GREIL and EMILE AUDIGER, citizens of the Republic of France, residing at 138 Faubourg St. Honoré, Paris, France, have invented certain new and useful Improvements in Electric Contacts or Current-Taking Devices, (for which Letters Patent of the United States No. 663,750 were granted us the 11th day of December, 1900, and which are surrendered for reissue in three divisions or patents,) of which the following is a specification.

This invention relates to certain new and useful improvements in electric contacts or current-taking devices for electric appliances, and more especially those intended for illuminating purposes.

The invention aims to construct an electric contact or current-taking device adapted for use in connection with electrical translating devices, as lamps and the like; and the object thereof is to connect the leading-in wires or contacts of the device by a pair of conducting projections with penetrable conducting-strips adapted to receive the conducting projections at any point of their length and also suitably arranged upon a table or other support in such manner that a number of lamps or the like may be arranged in various relations side by side in at least two directions transverse to one another to enable the establishment of luminous letters or signs especially for advertising purposes. The conducting-strips are intended to be connected to opposite terminals or source of electricity, so that on thrusting the conducting projections of the lamp or other device one into each strip they make contact and the lamp or other device is placed in circuit. Furthermore, the projections serve to secure the lamp or other device in position upon the support.

A further object of the invention is to provide a novel arrangement whereby translating devices, as lamps and the like, may be placed at various points and in various order along conductors, as will be described with reference to the accompanying drawings, in which—

Figure 1:
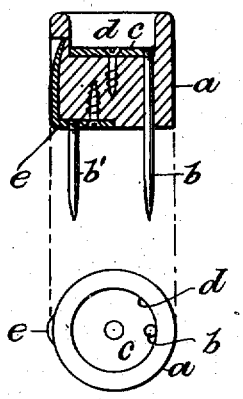
Figure 2:
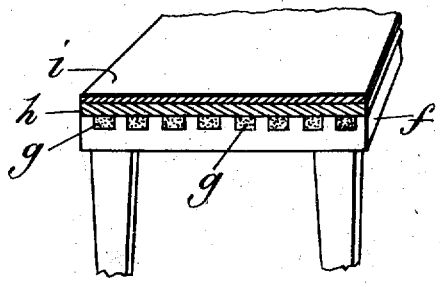

Figure 1 is a sectional elevation and plan of the connecting device, which is adapted to penetrate the conductors for completing the circuit and securing the lamps or other illuminating device in position. Fig. 2 represents the top structure of a table or other support constructed in accordance with our invention and provided with a series of parallel conducting-strips.

Referring to the drawings by reference-letters, *a* indicates a cylindrical connecting-block of insulating material, which is provided with the conducting projections *b b'*. These latter need not necessarily be fixed to the cylindrical block *a*, but may be adapted directly to the lamp or other translating device. The conducting projection *b* is in metallic connection with a strip of metal *c*, arranged at the bottom of a cavity *d*, formed in the base of the connecting-block *a* opposite to that in which the conducting projections are situated. The other conducting projection *b'* is in metallic connection with a band of metal *e*, arranged upon the periphery of the block *a*. The strip *c* and band *e* are contacts adapted to be in metallic connection with the leading-in wires or contacts of the lamps or other translating devices.

The reference-letter *f* denotes a top structure of a table or other support which is formed with a series of grooves, within which are lodged a number or series of parallel conducting-strips *g*, extending over the surface of the support to enable the translating devices to be arranged side by side in at least two directions transverse to one another. Upon the surface of the table or other support thus provided is arranged a sheet of asbestos material *h* and a cover of india-rubber *i*. The connections of the conducting-strips *g* with the positive and negative poles of the source of electricity are effected in any suitable manner, and it will of course be understood that at the extremities of the table the section of the conducting-strips *g* are covered with an insulated sheet. The conducting-strips are shown arranged parallel to one another, and they may be arranged in various shapes. For example, they may consist of straight parallel bands of a certain length or parallel concentric circles, &c., thus enabling the translating device or lamp to be arranged at any point in the length of the conducting-strips, and by such an arrangement not only can the translating device be placed in any desired position upon the top structure of a table or other support, but it will enable the arrangement of the translating devices or lamps in various positions, so as to form illuminated signs, letters, and designs. It will be seen that the translating devices can be arranged at any point in the length of the conducting masses, and also that they may be arranged side by side in at least two directions transverse to one another.

The projections *b b'* not only form a contact for illuminating a lamp or other device, but are of such length that they penetrate the conducting-strips, asbestos, and india-rubber cover and secure the lamps or other translating devices to the table or other support.

The metallic masses forming the conducting-strings intended for the conducting projections may be constructed of various materials to enable electrical communication with the projections and their penetration. The conducting masses may consist of metallic wires, thin metal sheets, lead shot, sheet-tin, plumbago, &c.

Having fully described our invention, what we claim as new, and desire to secure by Letters Patent, is—

1. The combination of a plurality of electric parallel conducting masses laid at substantially uniform distances apart in the grooves of a table or other support and constituting pairs, the whole number of said strips being connected alternately to the positive and negative poles of an electric generator, an insulating connecting-block, a pair of conducting projections secured thereto and adapted to penetrate two of said masses, and separate contacts suitably connected to each of said projections.

2. In combination, a connecting-block, penetrating conducting means attached to said block, and electric conducting-strips arranged at substantially uniform distances apart, and composing a number of pairs, and adapted to be in communication with a source of electrical supply, and arranged with the negative strips parallel with the positive strips, said strips adapted to receive throughout their length said penetrating means for forming an electrical circuit and securing said block thereto.

3. The combination of a plurality of electrical parallel conducting-strips mounted at substantially uniform distances apart upon a table or other support, and adapted to be connected to the positive and negative poles of an electric generator, and arranged so that the positive strips will be parallel with the negative strips, a connecting-block, and penetrating conducting projections attached to said block for engaging said strips for forming an electrical circuit and securing said block thereto.

4. In an electrical contact or current-taking device, penetrable conducting-strips arranged at substantially uniform distances apart over a large surface of a suitable support, and means for penetrating said strips for forming an electrical circuit and securing thereto at any point throughout the length of any two, a lamp or other illuminating device.

5. The combination with a support, of conducting masses carried thereby, and adapted to be connected, respectively, to the positive and negative poles of a source of electricity, said masses being spaced with substantial uniformity and sustaining a parallel relation, and adapted to have connection to a translating device at any point, and so arranged upon the support that translating devices may be arranged side by side close together in at least two directions transverse to one another at all portions of the support traversed by said masses, and conducting projections to penetrate the masses and place the translating device or devices in circuit.

6. The combination of a number of electric parallel conductors arranged without delineating any design, adapted to be connected alternately to the positive and negative poles of a source of electricity, and arranged upon a support in numbers sufficient and near enough together to permit of electric translating devices being engaged close together and side by side with said conductors, lengthwise of said conductors, or side by side transversely of the length of said conductors, so that the translating devices may be arranged to delineate letters, figures and other irregular forms, and conducting projections for penetrating said conductors to place the translating devices in circuit.

In testimony whereof we have signed our names to this specification in the presence of two subscribing witnesses.

ERNEST GREIL.
EMILE AUDIGER.

Witnesses:
EDWARD P. MACLEAN,
ANDRÉ LÉVY PICARD.